UNITED STATES PATENT OFFICE.

FRITZ HOFMANN, CARL COUTELLE, KURT MEISENBURG, AND KONRAD DELBRÜCK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

CAOUTCHOUC SUBSTANCES AND PROCESS OF MAKING SAME.

1,082,522. Specification of Letters Patent. Patented Dec. 30, 1913.

No Drawing. Application filed July 10, 1912. Serial No. 708,606.

*To all whom it may concern:*

Be it known that we, FRITZ HOFMANN, CARL COUTELLE, KURT MEISENBURG, and KONRAD DELBRÜCK, doctors of philosophy, chemists, citizens of the German Empire, residing at Elberfeld, Germany, have invented new and useful Improvements in new Caoutchouc Substances and Processes of Making Same, of which the following is a specification.

We have found that the hydrocarbons of the series

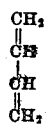

in which however at least one atom of H is substituted by an alkyl group containing more than one atom of carbon, such as ethyl, propyl, butyl, etc., and in which the other H atoms may or may not be substituted, for example:

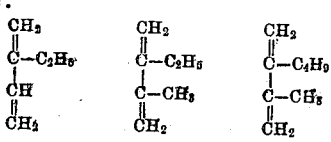

or completely substituted derivatives, etc., are converted by polymerization into new caoutchouc substances which may replace natural caoutchouc in its chemical and technical applications.

The present application is in part a continuation of our prior application 594,095.

The process for producing the new caoutchouc substances consists in polymerizing the above mentioned hydrocarbons in an appropriate manner as by heating so that the new caoutchouc substances are mainly produced. The process may also be carried out in the presence of agents which promote polymerization, such as acetic acid, acetic acid anhydrid, butyric acid, creosote, or which act as diluents, or in the presence of both such promoting and such diluting agents.

In order to illustrate the new process more fully the following examples are given, the parts being by weight:

Example A: Beta-ethylbutadiene is heated in an autoclave for four weeks to from 90–100° C. Unchanged hydrocarbon is removed and the residue is heated for some time *in vacuo* on the water bath the temperature of which is finally brought to boiling. A liquid distils over, while the new product remains behind.

Example B: Beta-isobutylbutadiene is heated for about 2 or 3 months to 70–80° C. or until a test sample after distillation leaves a residue behind which is insoluble in alcohol and soluble in coaltar benzene. The resulting mass is then introduced into alcohol while stirring. The polymerization product is thus obtained in the form of an elastic substance. By heating the product *in vacuo* impurities and unreacted upon hydrocarbon are driven off and the desired caoutchouc like substance remains behind.

The new caoutchouc substances are whitish substances soluble in benzene and insoluble in alcohol. They are normally free from protein substances which are always contained in the natural caoutchouc. They form ozonids, nitrosites and brom addition products. The ozonids correspond generally to the caoutchouc substances from which derived and indirectly to the hydrocarbons from which the caoutchouc substances are formed. They are in the vulcanized form whitish to grayish substances which are not adhesive.

Our method of polymerization may also be applied to mixtures of the above defined substitution derivatives of erythrene and other hydrocarbons of the erythrene series and similar groups in various proportions and the thus formed mixtures of new caoutchouc substances may be employed in the arts.

Our new caoutchouc substances described herein may be vulcanized and such vulcanized caoutchouc substances may be used in the same manner as vulcanized natural caoutchouc. We can also use a mixture of our new caoutchouc substances for example with those described in our other applications Ser. Nos. 578607, 578608, 588173 and subject this mixture to vulcanization, or we may mix our new caoutchouc substances with natural caoutchouc and subject this mixture to vulcanization.

We claim:

1. The process of producing a caoutchouc-like substance which comprises polymerizing a substituted erythrene hydrocarbon which hydrocarbon has at least one substituting group containing more than one atom of carbon until a caoutchouc-like substance is formed which is insoluble in alcohol but soluble in coaltar benzene.

2. The process of producing a caoutchouc-like substance which comprises polymerizing a substituted erythrene hydrocarbon which hydrocarbon has a substituting group in the beta position containing more than one atom of carbon until a caoutchouc-like substance is formed which is insoluble in alcohol but soluble in coaltar benzene.

3. The process of producing a caoutchouc like substance which comprises polymerizing an alkyl substituted erythrene hydrocarbon which hydrocarbon has at least one substituting group containing more than one atom of carbon until a caoutchouc-like substance is formed which is insoluble in alcohol but soluble in coaltar benzene.

4. The process of producing a caoutchouc like substance which comprises polymerizing an alkyl substituted erythrene hydrocarbon which hydrocarbon has a substituting group in the beta-position containing more than one atom of carbon until a caoutchouc-like substance is formed which is insoluble in alcohol but soluble in coaltar benzene.

5. The process of producing a caoutchouc like substance which comprises polymerizing an ethyl substituted erythrene hydrocarbon until a caoutchouc-like substance is formed which is insoluble in alcohol but soluble in coaltar benzene.

6. The process of producing a caoutchouc like substance which comprises polymerizing beta-ethyl-erythrene until a caoutchouc-like substance is formed which is insoluble in alcohol but soluble in coaltar benzene.

7. The process of producing a caoutchouc-like substance which comprises polymerizing by heating a substituted erythrene hydrocarbon which hydrocarbon has at least one substituting group containing more than one atom of carbon.

8. The process of producing a caoutchouc-like substance which comprises polymerizing by heating a substituted erythrene hydrocarbon which hydrocarbon has a substituting group in the beta position containing more than one atom of carbon.

9. The process of producing a caoutchouc like substance which comprises polymerizing by heating an alkyl-substituted erythrene hydrocarbon which hydrocarbon has at least one substituting group containing more than one atom of carbon.

10. The process of producing a caoutchouc like substance which comprises polymerizing by heating an alkyl substituted erythrene hydrocarbon which hydrocarbon has a substituting group in the beta-position containing more than one atom of carbon.

11. The process of producing a caoutchouc like substance which comprises polymerizing by heating an ethyl substituted erythrene hydrocarbon.

12. The process of producing a caoutchouc like substance which comprises polymerizing by heating beta-ethyl-erythrene.

13. The process of producing a caoutchouc-like substance which comprises polymerizing a substituted erythrene hydrocarbon which hydrocarbon has at least one substituting group containing more than one atom of carbon in the presence of a reagent promoting the polymerization until a caoutchouc-like substance is formed which is insoluble in alcohol but soluble in coaltar benzene.

14. The process of producing a caoutchouc-like substance which comprises polymerizing a substituted erythrene hydrocarbon which hydrocarbon has a substituting group in the beta position containing more than one atom of carbon in the presence of a reagent promoting the polymerization until a caoutchouc-like substance is formed which is insoluble in alcohol but soluble in coaltar benzene.

15. The process of producing a caoutchouc like substance which comprises polymerizing an alkyl substituted erythrene hydrocarbon which hydrocarbon has at least one substituting group containing more than one atom of carbon in the presence of a reagent promoting the polymerization until a caoutchouc-like substance is formed which is insoluble in alcohol but soluble in coaltar benzene.

16. The process of producing a caoutchouc like substance which comprises polymerizing an alkyl substituted erythrene hydrocarbon which hydrocarbon has a substituting group in the beta-position containing more than one atom of carbon in the presence of a reagent promoting the polymerization until a caoutchouc-like substance is formed which is insoluble in alcohol but soluble in coaltar benzene.

17. The process of producing a caoutchouc like substance which comprises polymerizing an ethyl substituted erythrene hydrocarbon in the presence of a reagent promoting the polymerization until a caoutchouc-like substance is formed which is insoluble in alcohol but soluble in coaltar benzene.

18. The process of producing a caoutchouc like substance which comprises polymerizing beta-ethyl-erythrene in the presence of a reagent promoting the polymerization until a caoutchouc-like substance is formed which is insoluble in alcohol but soluble in coaltar benzene.

19. The process of producing a caoutchouc-like substance which comprises polymerizing a substituted erythrene hydrocarbon which hydrocarbon has at least one substituting group containing more than one atom of carbon by heating the hydrocarbon until a test sample after suitable distillation leaves a residue behind which is insoluble in alcohol and soluble in coaltar benzene.

20. The process of producing a caoutchouc-like substance which comprises polymerizing a substituted erythrene hydrocarbon which hydrocarbon has a substituting group in the beta position containing more than one atom of carbon by heating the hydrocarbon until a test sample after suitable distillation leaves a residue behind which is insoluble in alcohol and soluble in coaltar benzene.

21. The process of producing a caoutchouc like substance which comprises polymerizing an alkyl substituted erythrene hydrocarbon which hydrocarbon has at least one substituting group containing more than one atom of carbon by heating the hydrocarbon until a test sample after suitable distillation leaves a residue behind which is insoluble in alcohol and soluble in coaltar benzene.

22. The process of producing a caoutchouc like substance which comprises polymerizing a substituted erythrene hydrocarbon which hydrocarbon has a substituting group in the beta-position containing more than one atom of carbon by heating the hydrocarbon until a test sample after suitable distillation leaves a residue behind which is insoluble in alcohol and soluble in coaltar benzene.

23. The process of producing a caoutchouc like substance which comprises polymerizing an ethyl substituted erythrene hydrocarbon by heating the hydrocarbon until a test sample after suitable distillation leaves a residue behind which is insoluble in alcohol and soluble in coal-tar benzene.

24. The process of producing a caoutchouc like substance which comprises polymerizing beta-ethylerythrene by heating the hydrocarbon until a test sample after suitable distillation leaves a residue behind which is insoluble in alcohol and soluble in coaltar benzene.

25. As a new product a caoutchouc-like substance comprising the caoutchouc-like polymerization product of a substituted erythrene hydrocarbon which hydrocarbon has a substituting group containing more than one atom of carbon, said product being insoluble in alcohol but soluble in coaltar benzene, forming ozonids, nitrosites and brom addition products, the ozonids corresponding indirectly to the erythrene hydrocarbons from which obtained, and said product being capable of vulcanization and being in the vulcanized form a whitish to grayish non-adhesive substance.

26. As a new product a caoutchouc-like substance comprising the caoutchouc-like polymerization product of a substituted erythrene hydrocarbon which hydrocarbon has a substituting group in the beta-position containing more than one atom of carbon, said product being insoluble in alcohol but soluble in coaltar benzene, forming ozonids, nitrosites and brom addition products, the ozonids corresponding indirectly to the erythrene hydrocarbons from which obtained, and said product being capable of vulcanization and being in the vulcanized form a whitish to grayish non-adhesive substance.

27. As a new product a caoutchouc like substance comprising the caoutchouc like polymerization product of an alkyl substituted erythrene hydrocarbon which hydrocarbon has a substituting group containing more than one atom of carbon, said product being insoluble in alcohol but soluble in coaltar benzene, forming ozonids, nitrosites and brom addition products, the ozonids corresponding indirectly to the erythrene hydrocarbons from which obtained, and said product being capable of vulcanization and being in the vulcanized form a whitish to grayish non-adhesive substance.

28. As a new product a caoutchouc like substance comprising the caoutchouc like polymerization product of an alkyl substituted erythrene hydrocarbon which hydrocarbon has a substituting group in the beta-position containing more than one atom of carbon, said product being insoluble in alcohol but soluble in coaltar benzene, forming ozonids, nitrosites and brom addition products, the ozonids corresponding indirectly to the erythrene hydrocarbons from which obtained, and said product being capable of vulcanization and being in the vulcanized form a whitish to grayish non-adhesive substance.

29. As a new product a caoutchouc like substance comprising an ethyl substituted erythrene caoutchouc, said product being insoluble in alcohol but soluble in coaltar benzene, forming ozonids, nitrosites and brom addition products, the ozonids corresponding indirectly to the erythrene hydrocarbons from which obtained, and said product being capable of vulcanization and being in the vulcanized form a whitish to grayish non-adhesive substance.

30. As a new product a caoutchouc like substance comprising beta-ethylerythrene caoutchouc.

31. As a new product a caoutchouc like substance comprising beta-ethylerythrene caoutchouc obtained by polymerization of beta-ethylerythrene which is characterized by being a whitish substance insoluble in alcohol soluble in coaltar benzene and in the vulcanized form is a non-adhesive whitish to grayish substance.

In testimony whereof we have hereunto set our hands in the presence of two subscribing witnesses.

FRITZ HOFMANN. [L. S.]
CARL COUTELLE. [L. S.]
KURT MEISENBURG. [L. S.]
KONRAD DELBRÜCK. [L. S.]

Witnesses:
HELEN NUFER,
ALBERT NUFER.